US011917371B2

(12) United States Patent
Wunderli et al.

(10) Patent No.: US 11,917,371 B2
(45) Date of Patent: Feb. 27, 2024

(54) SYSTEMS AND METHODS FOR FACILITATING INTERACTION WITH A GRAPHICAL USER INTERFACE VIEW DURING A HEARING DEVICE FITTING SESSION

(71) Applicant: SONOVA AG, Staefa (CH)

(72) Inventors: Felix Wunderli, Jona (CH); Martin Rahn, Staefa (CH)

(73) Assignee: Sonova AG, Staefa (CH)

( * ) Notice: Subject to any disclaimer, the term of this patent is extended or adjusted under 35 U.S.C. 154(b) by 114 days.

(21) Appl. No.: 17/681,254

(22) Filed: Feb. 25, 2022

(65) Prior Publication Data

US 2023/0276181 A1 Aug. 31, 2023

(51) Int. Cl.
*H04R 25/00* (2006.01)

(52) U.S. Cl.
CPC ......... *H04R 25/505* (2013.01); *H04R 25/554* (2013.01); *H04R 25/70* (2013.01); *H04R 2225/39* (2013.01); *H04R 2225/55* (2013.01)

(58) Field of Classification Search
CPC .... H04R 25/505; H04R 25/554; H04R 25/70; H04R 2225/39; H04R 2225/55
See application file for complete search history.

(56) References Cited

U.S. PATENT DOCUMENTS 10,896,020 B2 * 1/2021 Christiansen ........... G10L 25/78

OTHER PUBLICATIONS

KR 102240858 B1. Lee, Dong Seop. Translation (Year: 2019).*
"Phonak Target Step-by-step Guide", https://www.phonakpro.com/content/dam/celum/fitting-guide-target-7-1/target-step-by-step-guide/PH_Guide_Target_7.1.9_Step_by_step_EN_V1.00_029-1154-02.pdf (retrieved Feb. 22, 2022), 2021.

* cited by examiner

*Primary Examiner* — Brian Ensey
(74) *Attorney, Agent, or Firm* — ALG Intellectual Property, LLC

(57) ABSTRACT

An exemplary system includes a processor communicatively coupled to a memory and configured to execute instructions to access configuration parameters indicative of a current configuration of a hearing device and determine, based on the configuration parameters, a plurality of text-based notifications associated with the current configuration of the hearing device. Each text-based notification included in the plurality of text-based notifications may be indicative of a different issue to be considered when fitting the hearing device to a user. The processor may further execute the instructions to present, within a graphical user interface view displayed by a display device, a hearing device fitting interface concurrently with a listing of at least some of the plurality of text-based notifications.

20 Claims, 7 Drawing Sheets

SYSTEMS AND METHODS FOR FACILITATING INTERACTION WITH A GRAPHICAL USER INTERFACE VIEW DURING A HEARING DEVICE FITTING SESSION

BACKGROUND INFORMATION

Hearing devices (e.g., hearing aids) are used to improve the hearing capability and/or communication capability of users of the hearing devices. Such hearing devices are configured to process a received input sound signal (e.g., ambient sound) and provide the processed input sound signal to the user (e.g., by way of a receiver (e.g., a speaker) placed in the user's ear canal or at any other suitable location).

When a hearing device is initially provided to a user, and during follow-up tests and checkups thereafter, it is usually necessary to "fit" the hearing device to the user during a hearing device fitting session. Fitting of a hearing device to a user is typically performed by an audiologist or the like who presents various stimuli having different loudness levels, e.g., at different frequencies, to the user. The audiologist relies on subjective feedback from the user as to how such stimuli are perceived. The subjective feedback may then be used to generate an audiogram that indicates individual hearing thresholds and loudness comfort levels of the user.

The generated audiogram may be presented to an audiologist by way of one or more graphical user interfaces during the hearing device fitting session. For example, the audiogram may be recorded by a measurement device and then be stored, e.g., in a memory or other storage medium. The stored audiogram may then be accessed by the audiologist, e.g., at a later time, via the graphical user interface. Such graphical user interfaces may further provide information regarding a current configuration of the hearing device and identify various fitting options to be addressed by the audiologist in fitting the hearing device to a user. In conventional graphical user interfaces, icons are presented at different positions within the user interface to identify different fitting options and/or issues to be addressed. The audiologist may individually interact with the icons in turn to access information associated with a respective fitting option or resolve an issue. However, such interaction is time consuming in cases where there are numerous fitting options to be addressed. Moreover, with such graphical user interfaces, it is difficult for an audiologist to easily identify and address all of the possible fitting options during the hearing device fitting session.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Systems and methods for facilitating interaction with a graphical user interface view during a hearing device fitting session are described herein. As will be described in more detail below, an exemplary system may comprise a memory storing instructions and a processor communicatively coupled to the memory and configured to execute the instructions to access configuration parameters indicative of a current configuration of a hearing device and determine, based on the configuration parameters, a plurality of text-based notifications associated with the current configuration of the hearing device. Each text-based notification included in the plurality of text-based notifications may be indicative of a different issue to be considered when fitting the hearing device to a user. The processor may further execute the instructions to present, within a graphical user interface view displayed by a display device, a hearing device fitting interface concurrently with a listing of at least some of the plurality of text-based notifications.

By providing systems and methods such as those described herein, it may be possible to provide improved graphical user interface views that facilitate a hearing care professional fitting a hearing device to a user during a hearing device fitting session. For example, systems and methods such as those described herein may present a plurality of text-based notifications in a manner that facilitates a hearing care professional easily and quickly identifying, in a single glance, various issues, information, and/or possible adjustment options to consider while fitting a hearing device to a user during a hearing device fitting session. In addition, the systems and methods described herein may implement a prioritized presentation of text-based notifications to facilitate a hearing care professional quickly identifying relatively more important issues to address and/or relatively more important information to consider while fitting a hearing device to a user. Other benefits of the systems and methods described herein will be made apparent herein.

Figure 1:
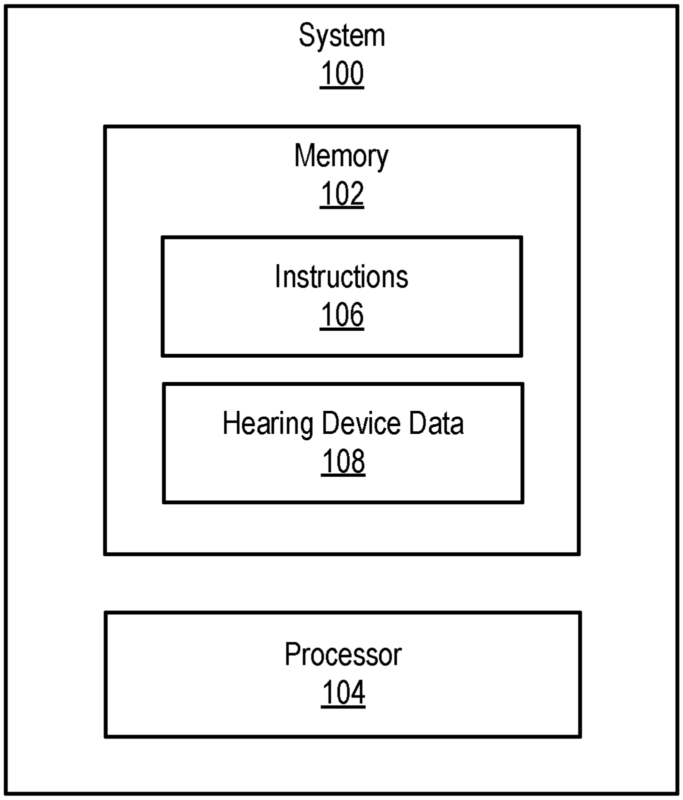
FIG. 1 illustrates an exemplary system that may be implemented according to principles described herein.

FIG. 1 illustrates an exemplary system 100 that may be implemented according to principles described herein. System 100 may be implemented by any number of computing devices, such as one or more fitting devices, personal computers, mobile devices (e.g., a smartphone or a tablet computer), cloud computing devices, etc. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and processor 104 may be distributed between multiple devices (e.g., multiple computing devices) and/or multiple locations as may serve a particular implementation.

Memory 102 may maintain (e.g., store) executable data used by processor 104 to perform any of the operations associated with system 100 described herein. For example, memory 102 may store instructions 106 that may be executed by processor 104 to perform any of the operations associated with system 100 described herein. Instructions 106 may be implemented by any suitable application, software, code, and/or other executable data instance.

As shown in FIG. 1, memory 102 may also store hearing device data 108 that may include any suitable data associated with a hearing device that may be communicatively coupled to system 100. For example, hearing device data 108 may include any suitable configuration parameters (e.g., current and/or previous configuration parameters), operating programs, frequency lowering schemes, fitting programs, hearing thresholds, target gain curves, graphical user interface content, etc. that may be associated with a hearing device communicatively coupled to system 100, a user of the hearing device, and/or a hearing device fitting session. In certain examples, hearing device data 108 may include data that is specific to a particular user of a hearing device.

Memory 102 may also maintain any data received, generated, managed, used, and/or transmitted by processor 104. For example, memory 102 may maintain any data suitable to facilitate communications (e.g., wired and/or wireless communications) between system 100 and one or more hearing devices, such as those described herein. Memory 102 may maintain additional or alternative data in other implementations.

Processor 104 may be implemented by one or more processors included in one or more computing devices and is configured to perform any suitable processing operation that may be associated with system 100. For example, processor 104 may be configured to perform (e.g., execute instructions 106 stored in memory 102 to perform) various processing operations associated with facilitating interaction with a graphical user interface view during a hearing device fitting session. For example, such processing operations may include presenting one or more graphical user interface views such as those described herein for display to a hearing care professional (e.g., an audiologist) to facilitate the hearing care professional fitting a hearing device to a user of the hearing device during a fitting session. These and other operations that may be performed by processor 104 are described herein.

Figure 2:
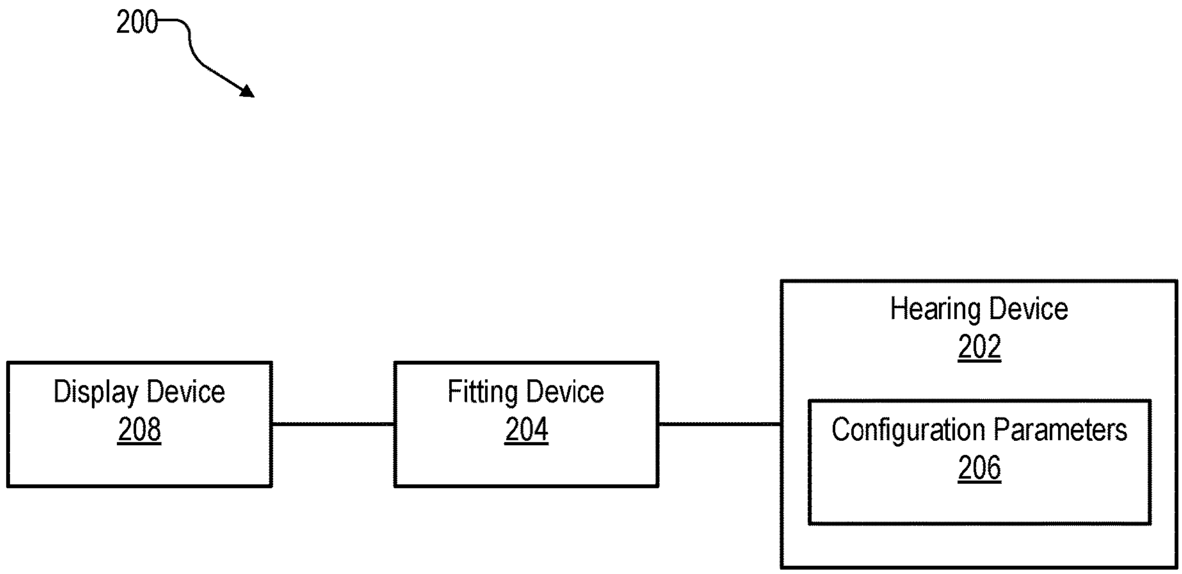
FIG. 2 illustrates an exemplary implementation of the system of FIG. 1 according to principles described herein.

FIG. 2 shows an exemplary configuration 200 in which system 100 may be implemented. As shown in FIG. 2, a hearing device 202 may be selectively and communicatively coupled to a fitting device 204. As used herein, a "hearing device" may be implemented by any device configured to provide or enhance hearing to a user. For example, a hearing device may be implemented by one or more hearing aids configured to amplify audio content to a user, a sound processor included in a cochlear implant system configured to apply electrical stimulation representative of audio content to a user, a sound processor included in a stimulation system configured to apply electrical and acoustic stimulation to a user, or any other suitable hearing prosthesis or combination of hearing prostheses. In some examples, a hearing device may be implemented by a behind-the-ear ("BTE") hearing device configured to be worn behind an ear and/or at least partially within an ear canal of a user, an in-the-ear ("ITE") hearing device configured to worn at least partially within the ear canal of the user, and/or any other suitable type of hearing device.

Hearing device 202 may be communicatively coupled to fitting device 204 in any suitable manner and through any suitable communication interface. For example, hearing device 202 may be wirelessly connected to fitting device 204 using any suitable wireless communication protocol. Alternatively, hearing device 202 may be communicatively coupled to fitting device 204 by way of a wired connection.

Although only one hearing device 202 is shown in FIG. 2, it is understood that hearing device 202 may be included in a system that includes more than one hearing device configured to provide or enhance hearing to a user. For example, hearing device 202 may be included in a binaural hearing system that includes two hearing devices, one for each ear. In such examples, hearing device 202 may be provided behind, for example, the left ear of the user and an additional hearing device may be provided behind the right ear of the user. When hearing device 202 is included as part of a binaural hearing system, hearing device 202 may communicate with the additional hearing device by way of a binaural communication link that interconnects hearing device 202 with the additional hearing device. Such a binaural communication link may include any suitable wireless or wired communication link as may serve a particular implementation.

As shown in FIG. 2, hearing device 202 may store, maintain, or otherwise be associated with configuration parameters 206. Configuration parameters 206 may include any information associated with hearing device 202. For example, configuration parameters 206 may include information regarding a current configuration of hearing device 202, information regarding who (e.g., a user, a hearing care professional, etc.) made changes to settings of hearing device 202, information regarding usage of hearing device 202, information regarding a previous configuration of hearing device 202, and/or any other suitable information.

Fitting device 204 may be implemented by any suitable computing device or combination of computing devices as may serve a particular implementation. For example, fitting device 204 may be implemented by any suitable computing device, such as described herein, that may be communicatively coupled to hearing device 202.

As shown in FIG. 2, fitting device 204 is communicatively coupled to a display device 208. Fitting device 204 may be communicatively coupled to display device 208 in any suitable manner and through any suitable communication interface. Display device 208 may be implemented by any suitable type of display device as may serve a particular implementation. For example, display device 208 may be implemented by a display screen of a laptop computer or a desktop computer implementing fitting device 204. In certain alternative implementations, display device 208 may be implemented by an external display device that is separate from but communicatively coupled to fitting device 204.

System 100 may be implemented solely by fitting device 204 or may be distributed across hearing device 202, fitting device 204, display device 208, and/or any other suitable device or system.

While hearing device 202 is communicatively coupled to fitting device 204, fitting device 204 (e.g., processor 104 of system 100) may present various graphical user interface views by way of display device 208 to facilitate fitting hearing device 202 to a user. Such graphical user interface views may include information based on configuration parameters 206 of hearing device 202. Accordingly, system 100 may be configured to access configuration parameters 206 to facilitate generating the graphical user interface views. System 100 may access configuration parameters 206 in any suitable manner. For example, system 100 may detect a connection between hearing device 202 and fitting device 204. Based on the connection, system 100 may query hearing device 202 in any suitable manner for configuration parameters 206. In certain alternative examples, system 100 may access configuration parameters 206 from any suitable other source (e.g., a source external to hearing device 202).

In certain examples, system 100 may access additional configuration parameters indicative of previous configurations of hearing device 202. System 100 may access such additional configuration parameters in any suitable manner. For example, system 100 may query hearing device 202 for the additional configuration parameters. Alternatively, system 100 may access the additional configuration parameters from any suitable other source.

Based on the configuration parameters, system 100 may determine a plurality of text-based notifications associated with hearing device 202. Each text-based notification included in the plurality of text-based notifications may be indicative of a different issue to be considered when fitting hearing device 202 to a user. In certain examples, at least some of the text-based notifications included in the plurality of text-based notifications may be associated with a current configuration of hearing device 202. Additionally or alternatively, at least some of the text-based notifications included in the plurality of text-based notifications may be associated with a previous configuration of hearing device 202.

System 100 may determine the plurality of text-based notifications in any suitable manner. For example, system 100 may determine text-based notifications based on information regarding settings (e.g., current settings, previous settings, and/or settings that need to be changed) of hearing device 202, based on missing information needed to fit hearing device 202 to a user, based on problems associated with operation of hearing device 202, based on tests that need to be performed to fit hearing device 202 to a user, based on usage of hearing device 202 by the user, and/or based on any other suitable information and/or parameter that may be associated with hearing device 202.

In certain examples, at least some of the text-based notifications of the plurality of text-based notifications may be determined based on a deviation between configuration parameters 206 and default parameters indicative of essential operating parameters of hearing device 202. In such examples, system 100 may compare configuration parameters 206 to the default parameters. This may be accomplished in any suitable manner. For example, system 100 may compare a value of a specific parameter included in configuration parameters 206 to a value of a corresponding parameter included in the default parameters. Based on the comparing of configuration parameters 206 to the default parameters, system 100 may determine that there is a deviation between configuration parameters 206 and the default parameters. To illustrate an example, a default parameter may specify a maximum allowable gain setting for hearing device 202. System 100 may compare a current gain setting for hearing device 202 with respect the maximum allowable gain setting for hearing device 202. Based on the comparison, system 100 may determine that the current gain setting exceeds the maximum gain allowable gain setting.

Based on the deviation, system 100 may generate a text-based notification that provides information regarding the deviation. Continuing with the example above, the current gain setting exceeding the maximum allowable gain setting may cause hearing device 202 to operate improperly. Accordingly, system 100 may generate a text-based notification configured to provide information regarding the current gain setting and facilitate the hearing care professional taking action to reduce the current gain setting to fix the issue.

The plurality of text-based notifications may provide any suitable information that may be associated with hearing device 202. In certain examples, the plurality of text-based notifications may include a first set of text-based notifications associated with actions performed by a user of hearing device 202 and a second set of text-based notifications associated with issues to be resolved when fitting hearing device 202 to the user. System 100 may determine any suitable number of text-based notifications as may serve a particular implementation. Specific examples of text-based notifications that may be presented by system 100 are described further herein.

Figure 3:
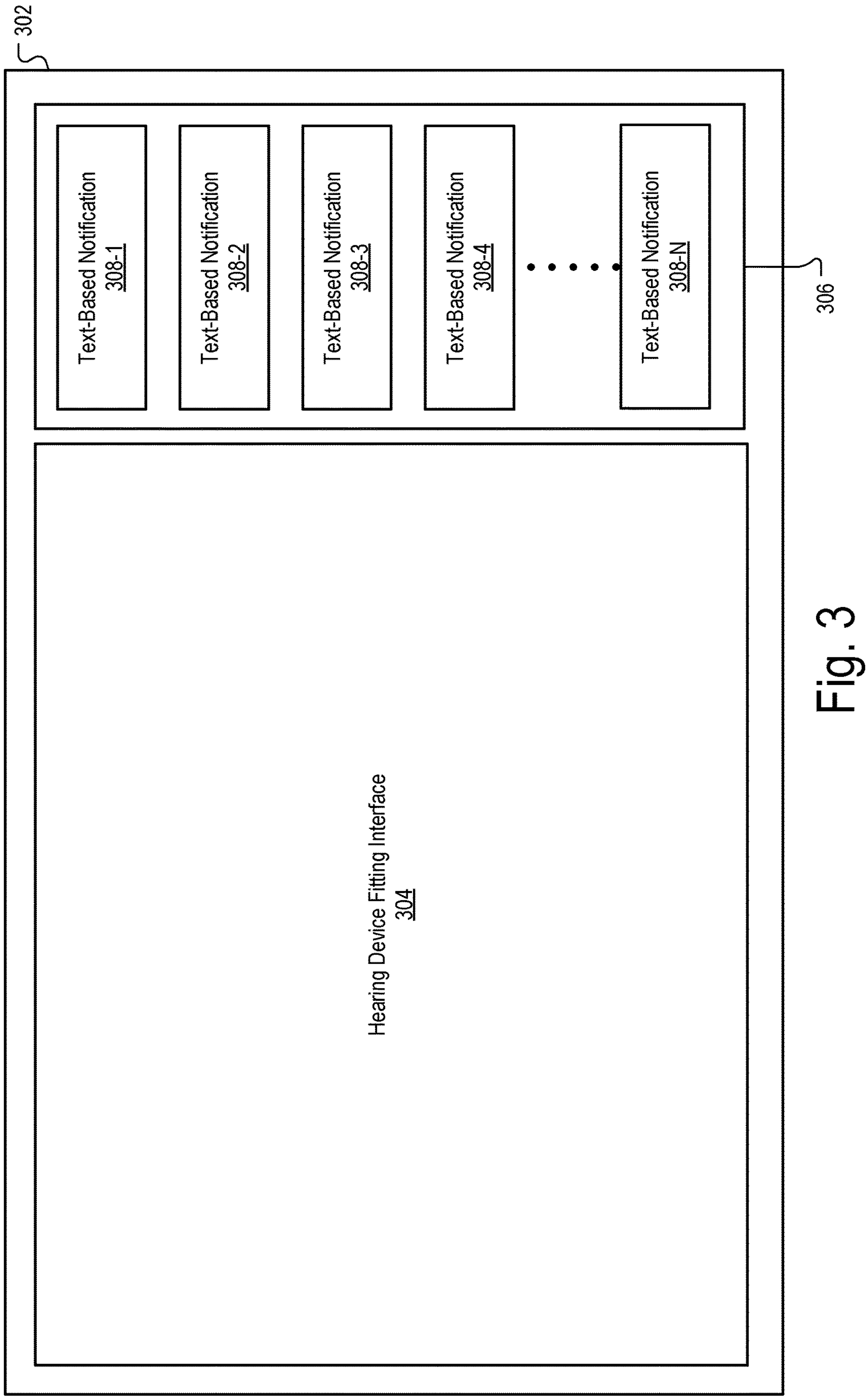
FIGS. 3-5 illustrate exemplary graphical user interface views that may be presented according to principles described herein.

System 100 may present text-based notifications to a user in any suitable manner. For example, system may present, within a graphical user interface view displayed by display device 208, a hearing device fitting interface concurrently with a listing of at least some of a plurality of text-based notifications. System 100 may present the hearing device fitting interface concurrently with the listing in the graphical user interface view in any suitable manner. To illustrate, FIG. 3 shows an exemplary graphical user interface view 302 that may be presented by system 100 in certain implementations. As shown in FIG. 3, graphical user interface view 302 includes a hearing device fitting interface 304 that is presented concurrently with a listing 306 that includes a plurality of text-based notifications 308 (e.g., text-based notifications 308-1 through 308-N).

Hearing device fitting interface 304 may include any suitable information, setting selection options, etc. to facilitate a hearing care professional fitting hearing device 202 to a user. In certain examples, hearing device fitting interface 304 may include one or more graphs with audiograms, target gain prescriptions, target sound pressure levels, and/or any other suitable information to facilitate a hearing care professional fitting hearing device 202 to a user.

Listing 306 may be concurrently presented together with hearing device fitting interface 304 in any suitable manner. In the example shown in FIG. 3, listing 306 is presented within a side pane that is adjacent to but separate from hearing device fitting interface 304. In certain alternative examples, listing 306 may be fully or at least partially overlaid over hearing device fitting interface 304. In addition, listing 306 is provided on a right side of hearing device fitting interface 304 in the example shown in FIG. 3. However, it is understood that listing 306 may be presented at different locations in other implementations. For example, listing 306 may be provided adjacent to a left side of hearing device fitting interface 304 in certain alternative implementations.

As shown in FIG. 3, text-based notifications 308 may be displayed within graphical user interface view 302 in a column including a plurality of rows. A different one of plurality of text-based notifications 308 may be presented in each row included in the plurality of rows. In the example shown in FIG. 3, only one column is shown in listing 306. However, it is understood that two or more columns of text-based notifications 308 may be presented within listing 306 in certain alternative implementations.

System 100 may present listing 306 within graphical user interface view 302 at any suitable time. For example, in certain implementations, system 100 may begin presenting listing 306 within graphical user interface view 302 based on a user input provided by a hearing care professional. For example, the hearing care professional may select a graphical object (not shown) displayed within graphical user interface view 302 to initiate presentation of listing 306 during a hearing device fitting session.

In certain alternative examples, system 100 may be configured to automatically present listing 306 within graphical user interface view 302 at any suitable time during a hearing device fitting session. As used herein, the expression "automatically" means that an operation (e.g., determining a plurality of text-based notifications and/or presenting a listing within a graphical user interface view) or series of operations are performed without requiring further input from a user. For example, in certain implementations, system 100 may automatically present listing 306 within graphical user interface view 302 at any suitable time during a hearing device fitting session without requiring the user to provide a user input by way of a user selectable icon or any other input.

In certain examples, the text-based notifications currently presented within listing 306 may represent all of the remaining issues to be addressed (e.g., problems, requirements, etc.) for a successful fitting of hearing device 202 to a user. With such a configuration, it is possible for a hearing care professional to quickly and easily visualize, with a single glance, all of the remaining issues to be addressed when fitting hearing device 202 to a user.

In certain alternative examples, the text-based notifications currently presented within listing 306 may correspond to a subset of plurality of text-based notifications 308. That is, there may be more text-based notifications available than can be displayed within listing 306 at a given time. In such examples, system 100 may facilitate a user providing any suitable user input to scroll listing 306 in either an upward direction or a downward direction to replace the text-based notifications currently displayed within listing 306 with additional text-based notifications included in plurality of text-based notifications 308.

In certain examples, system 100 may prioritize an order in which plurality of text-based notifications 308 are presented within listing 306. For example, relatively more important text-based notifications may be provided at the top of listing 306 whereas relatively less important text-based notifications may be provided towards the bottom of listing 306. To that end, system 100 may determine a ranking for each text-based notification included in plurality of text-based notifications 308. System 100 may rank text-based notifications in any suitable manner as may serve a particular implementation. For example, the ranking may correspond to a composite score that takes into consideration various different factors associated with each text-based notification 308. A text-based notification 308 with the highest composite score may be considered more important/urgent and, as such, may be presented at the top of listing 306. Other text-based notifications 308 may be positioned in listing 306 in order of decreasing composite scores towards the bottom of listing 306.

In certain examples, system 100 may implement multiple levels of ranking for text-based notifications 308. For example, a first level of ranking may include ranking a first set of text-based notifications higher than a second set of text-based notifications. To illustrate, the first set of text-based notifications may be associated with issues that need to be resolved to properly fit hearing device 202 to a user. The second set of text-based notifications may be associated with information regarding a current configuration of hearing device 202. In such examples, system 100 may rank the first set of text-based notifications higher than the second set of text-based notifications. A second level of ranking may include a further ranking text-based notifications within a specific set of text-based notifications. For example, text-based notifications included in the first set of text-based notifications may be further ranked with respect to other text-based notifications included in the first set of text-based notifications. In a similar manner, text-based notifications included in the second set of text-based notifications may be further ranked with respect to other text-based notifications included in the second set of text-based notifications. To illustrate an example, the first set of text-based notifications may include a first text-based notification that identifies a malfunctioning part (e.g., a malfunctioning receiver) of hearing device 202 and a second text-based notification that identifies a missing test (e.g., a real ear test) that needs to be performed to properly fit hearing device 202 to a user. In such examples, the second level of ranking may include ranking the first text-based notification higher than the second text-based notification within the first set of text-based notifications.

In certain examples, the ranking for text-based notifications included in plurality of text-based notifications 308 may be based on an associated restorability parameter. Such a restorability parameter may indicate whether an associated text-based notification represents a possibility to restore at least one configuration parameter included in configuration parameters 206 to a previous configuration of hearing device 202. In such examples, system 100 may associate each text-based notification with a restorability parameter. Such a restorability parameter may be implemented in any suitable manner. For example, a positive restorability parameter may indicate that a configuration parameter is restorable to a previous configuration parameter whereas a negative restorability parameter may indicate that a configuration parameter is not restorable to a previous configuration parameter. Text-based notifications with a positive restorability parameter may be ranked higher and may be displayed more prominently within listing 306 than text-based notifications with a negative restorability parameter.

Figure 4:
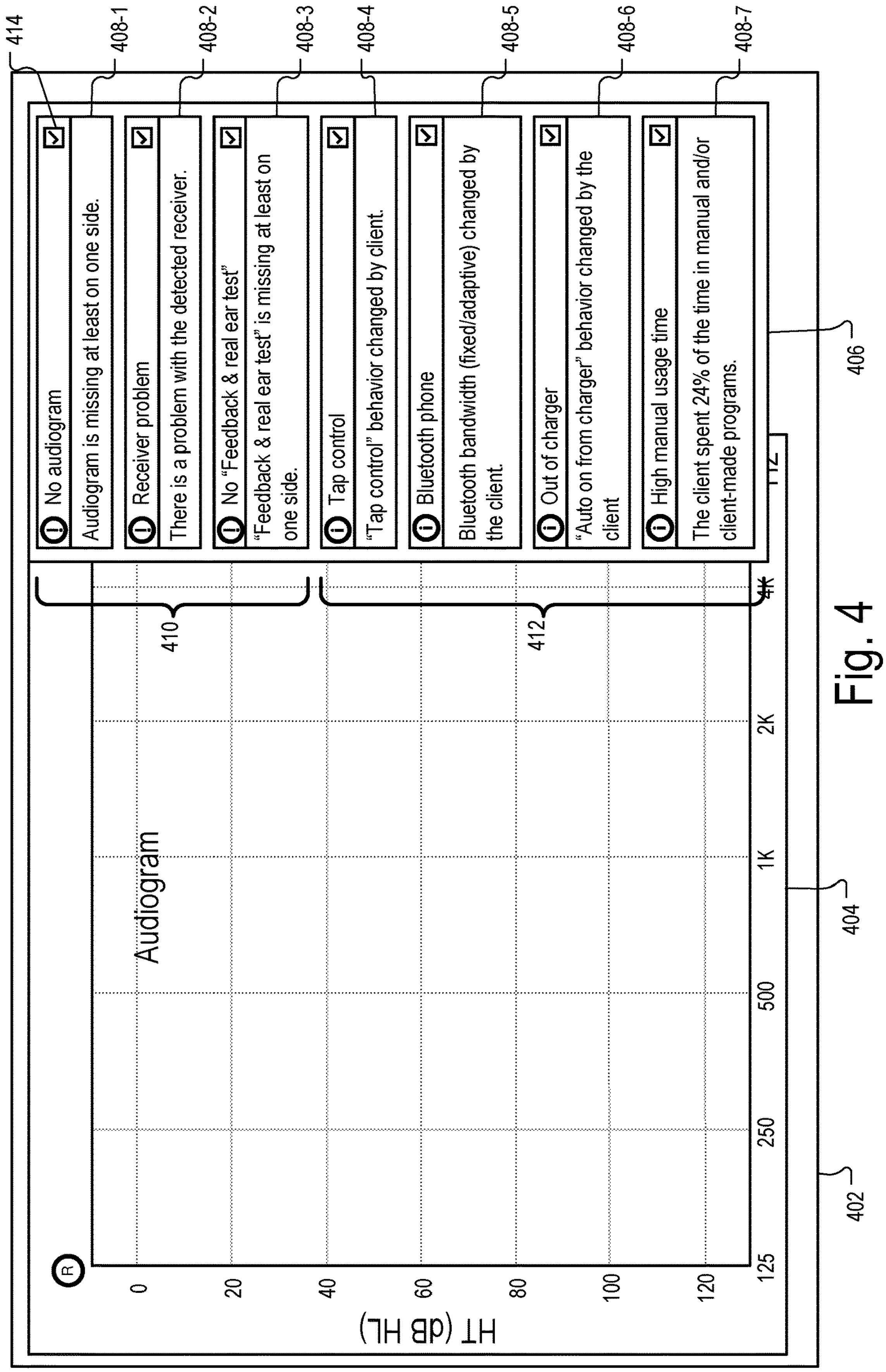

FIG. 4 depicts an exemplary graphical user interface view 402 that shows exemplary text-based notifications and how they may be ordered within a listing of text-based notifications in certain examples. As shown in FIG. 4, a graphical user interface view 402 includes a hearing device fitting interface 404 and a listing 406 that includes a plurality of text-based notifications 408 (e.g., text-based notifications 408-1 through 408-7).

Plurality of text-based notifications 408 include a first set of text-based notifications 410 and a second set of text-based notifications 412. In the example, shown in FIG. 4, first set of text-based notifications 410 are associated with issues that need to be resolved to fit hearing device 202 to a user during a hearing device fitting session. For example, text-based notification 408-1 indicates that an audiogram is missing, text-based notification 408-2 indicates that there is a receiver problem, and text-based notification 408-3 indicates that a feedback and real ear test is missing. In the example shown in FIG. 4, text-based notification 408-2 may be provided relatively higher within listing 406 than text-based notification 408-3 because the receiver problem may need to be addressed prior to performing a real ear test.

Second set of text-based notifications 412 provide information associated with actions of a user (also referred to as a client) of hearing device 202. For example, text-based notification 408-4 indicates that tap control of hearing device 202 has been changed by the client, text-based notification 408-5 indicates that the client has changed a Bluetooth setting associated with hearing device 202, text-based notification 408-6 indicates that a charger setting has been changed by the client, and text-based notification 408-7 provides information regarding usage of hearing device 202 by the client. Each of text-based notifications 408-4 through 408-7 represent information that may be considered by a hearing care professional during a hearing device fitting session. In contrast, each of text-based notifications 408-1 through 408-3 represent issues that need to be resolve to properly fit hearing device 202 to a user. Accordingly, text-based notifications 408-1 through 408-3 may be presented more prominently within listing 406 (e.g., at the top portion of listing 406) as compared to second set of text-based notifications 412.

Text-based notifications 408 depicted in FIG. 4 are provided for illustrative purposes only and are merely examples of possible text-based notifications that may be presented by system 100. It is understood that additional or alternative text-based notifications may be presented in other implementations. For example, additional or alternative text-based notifications may include one or more of the following: "Charger auto on/off is different in session and on hearing device;" "Tap control configuration is different in session and on hearing device;" "Bluetooth codec settings (bandwidth) is different in session and on hearing device;" "Use of manual programs and custom scenarios (including an indication of a percentage of use);" "Feedback test not done;" "Receiver check failed;" and/or any other suitable information.

In certain examples, a text-based notification included in the plurality of text-based notifications presented in a listing may be provided with a graphical object that is selectable by way of a user input to at least one of access information associated with the text-based notification or resolve an issue associated with the text-based notification. To illustrate, in the example shown in FIG. 4, a graphical object 414 is provided with respect to text-based notification 408-1. Graphical object 414 is selectable by a hearing care professional to facilitate resolving the issue of a missing audiogram. A similar icon is provided with respect to each of text-based notifications 408-2 through 408-7 to facilitate addressing issues associated with the corresponding text-based notifications.

System 100 may detect any suitable user input with respect to a graphical object such as graphical object 414. For example, system 100 may detect a mouse click, a touch input, or any other suitable user input with respect to graphical object 414. Based on the user input, system 100 may perform an operation with respect to hearing device 202. The operation may correspond to any suitable operation or combination of operations that may be performed with respect to hearing device 202 and may be associated with a corresponding text-based notification 408. For example, the operation may include adjusting one or more of configuration parameters 206, restoring a previous configuration of hearing device 202, and/or performing any other suitable operation. To illustrate an example, in response to a user input provided with respect to graphical object 414 associated with text-based notification 408-1, system 100 may perform one or more operations to facilitate generating or otherwise acquiring an audiogram to be used to fit hearing device 202 to a user during a hearing device fitting session. For instance, the audiogram may be acquired from a memory (or other storage medium) in which the audiogram has been stored after the audiogram has been generated. For example, the audiogram may be generated by a measurement device comprising such a memory. The measurement device may be provided external from system 100, or the measurement device may be included in the system 100. To illustrate another example, the high manual usage time indicated by text-based notification 408-7 may indicate that the user of hearing device 202 is not satisfied with the current configuration of hearing device 202 in certain circumstances. In response to a user input provided with respect to the graphical object provided in the upper right corner of text-based notification 408-7, system 100 may provide any suitable information regarding when the client-made programs are used, what settings are changed by the client, etc. to better fit hearing device 202 to the client.

Figure 5:
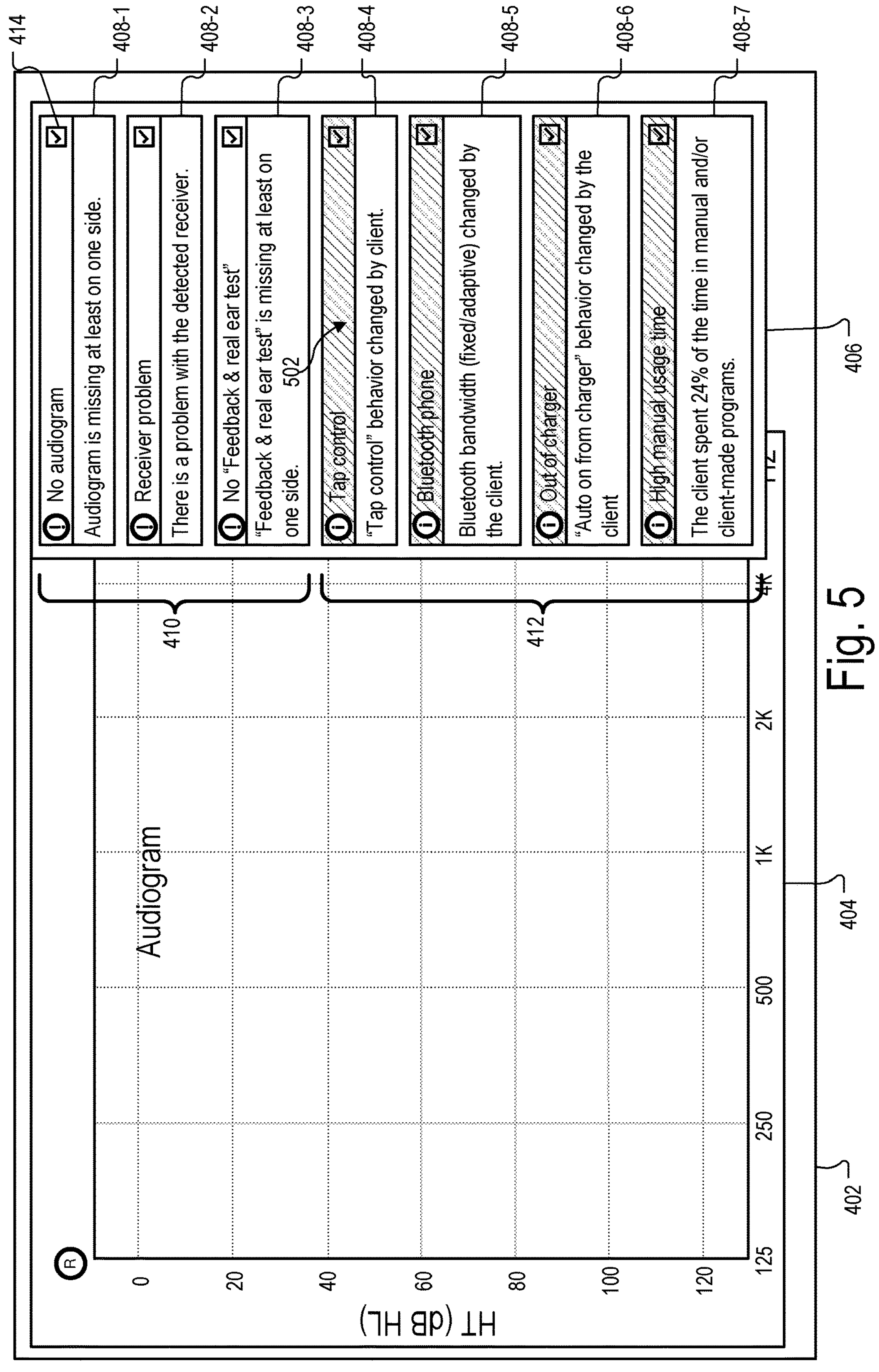

In certain examples, at least some text-based notifications included in a plurality of text-based notifications may include a graphical effect that visually differentiates them from other text-based notifications included in the plurality of text-based notifications. Any suitable graphical effect may be used as may serve a particular implementation. For example, a first set of text-based notifications included in the plurality of text-based notifications may be presented together with a first color and a second set of text-based notifications included in the plurality of text-based notifications may be presented together with a second color that is different than the first color. In certain alternative implementations, shading may be provided with respect to a portion of at least some of the text-based notifications included in a listing. To illustrate, FIG. 5 shows a graphical effect in the form of shading 502 on a portion of text-based notifications 408-4 through 408-7 in second set of text-based notifications 412. Text-based notifications 408-1 through 408-3 in first set of text-based notifications 410 do not include the shading. Through the shading or lack thereof, a hearing care professional may be able to easily recognize which of text-based notifications 408 are relatively more important (e.g., those without shading that need to be addressed to properly fit hearing device 202 to a user) and which text-based notifications are relatively less important (e.g., those with shading that provide information but that do not necessarily need to be addressed for hearing device 202 to operate properly).

Figure 6:
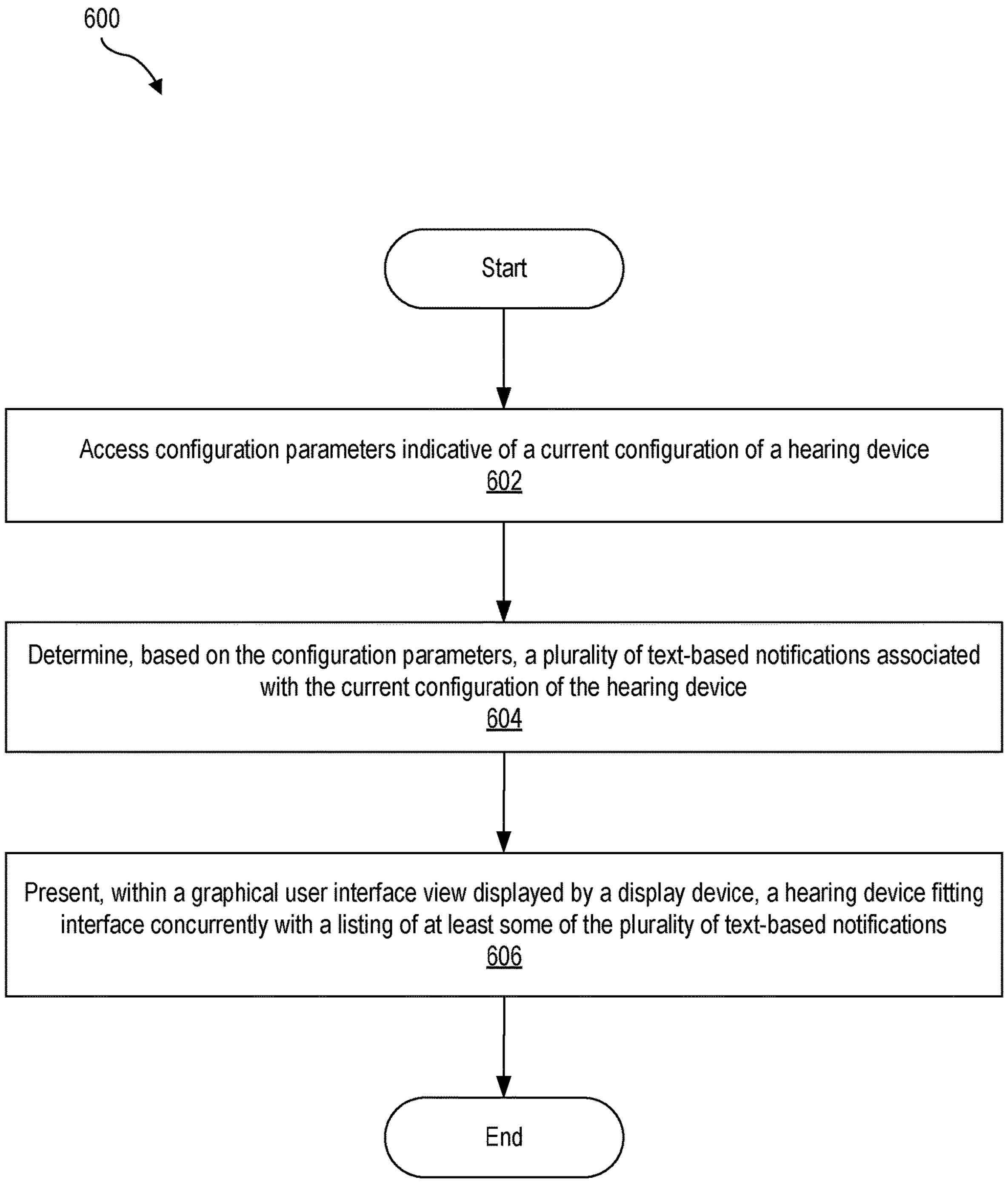
FIG. 6 illustrates an exemplary method according to principles described herein.

FIG. 6 illustrates an exemplary method 600 for facilitating interaction with a graphical user interface view during a hearing device fitting session according to principles described herein. While FIG. 6 illustrates exemplary operations according to one embodiment, other embodiments may omit, add to, reorder, and/or modify any of the operations shown in FIG. 6. One or more of the operations shown in FIG. 6 may be performed by a hearing device such as hearing device 202 a computing device such as processor 104, any components included therein, and/or any combination or implementation thereof.

At operation 602, a processor such as processor 104 may access configuration parameters indicative of a current configuration of a hearing device. Operation 602 may be performed in any of the ways described herein.

At operation 604, the processor may determine, based on the configuration parameters, a plurality of text-based notifications associated with the current configuration of the hearing device. As describe herein, each text-based notification included in the plurality of text-based notifications may be indicative of a different issue to be considered when fitting the hearing device to a user. Operation 604 may be performed in any of the ways described herein.

At operation 606, the processor may present, within a graphical user interface view displayed by a display device, a hearing device fitting interface concurrently with a listing of at least some of the plurality of text-based notifications. Operation 606 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 7:
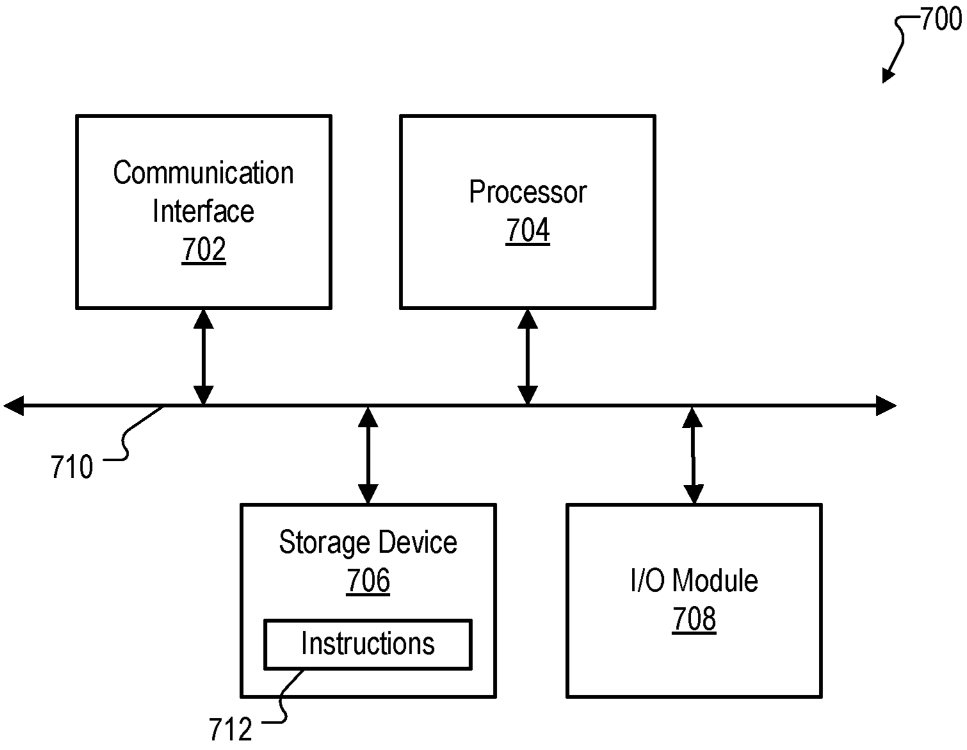
FIG. 7 illustrates an exemplary computing device according to principles described herein.

FIG. 7 illustrates an exemplary computing device 700 that may be specifically configured to perform one or more of the processes described herein. As shown in FIG. 7, computing device 700 may include a communication interface 702, a processor 704, a storage device 706, and an input/output ("I/O") module 708 communicatively connected one to another via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data and/or interpreting, executing, and/or directing execution of one or more of the instructions, processes, and/or operations described herein. Processor 704 may perform operations by executing computer-executable instructions 712 (e.g., an application, software, code, and/or other executable data instance) stored in storage device 706.

Storage device 706 may include one or more data storage media, devices, or configurations and may employ any type, form, and combination of data storage media and/or device. For example, storage device 706 may include, but is not limited to, any combination of the non-volatile media and/or volatile media described herein. Electronic data, including data described herein, may be temporarily and/or permanently stored in storage device 706. For example, data representative of computer-executable instructions 712 configured to direct processor 704 to perform any of the operations described herein may be stored within storage device 706. In some examples, data may be arranged in one or more databases residing within storage device 706.

I/O module 708 may include one or more I/O modules configured to receive user input and provide user output. I/O module 708 may include any hardware, firmware, software, or combination thereof supportive of input and output capabilities. For example, I/O module 708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the systems, hearing devices, computing devices, and/or other components described herein may be implemented by computing device 700. For example, memory 102 may be implemented by storage device 706 and processor 104 may be implemented by processor 704.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:

a memory storing instructions; and a processor communicatively coupled to the memory and configured to execute the instructions to:

access configuration parameters indicative of a current configuration of a hearing device;

determine, based on the configuration parameters, a plurality of text-based notifications associated with the current configuration of the hearing device, each text-based notification included in the plurality of text-based notifications indicative of a different issue to be considered when fitting the hearing device to a user;

determine a ranking for each text-based notification included in the plurality of text-based notifications;

select an order of text-based notifications included in a listing of at least some of the plurality of text-based notifications based on the ranking for each text-based notification; and present, within a graphical user interface view displayed by a display device, a hearing device fitting interface concurrently with the listing of the at least some of the plurality of text-based notifications.

2. The system of claim 1, wherein the accessing of the configuration parameters includes:

detecting a connection between the hearing device and a fitting device; and querying, based on the connection, the hearing device for the configuration parameters indicative of the current configuration of the hearing device.

3. The system of claim 1, wherein:

the processor is further configured to execute the instructions to:

compare the configuration parameters to default parameters indicative of essential operating parameters of the hearing device; and determine, based on the comparing of the configuration parameters to the default parameters, that there is a deviation between the configuration parameters and the default parameters; and the determining of at least some of the plurality of text-based notifications is based on the deviation between the configuration parameters and the default parameters.

4. The system of claim 1, wherein:

the processor is further configured to execute the instructions to associate each text-based notification included in the plurality of text-based notifications with a restorability parameter that indicates whether an associated text-based notification represents a possibility to restore at least one configuration parameter included in the configuration parameters to a previous configuration of the hearing device; and the ranking for each text-based notification is based on an associated restorability parameter.

5. The system of claim 1, wherein the listing of the at least some of the plurality of text-based notifications is presented within a side pane that is adjacent to the hearing device fitting interface.

6. The system of claim 1, wherein the listing of the at least some of the plurality of text-based notifications is overlaid over at least part of the hearing device fitting interface.

7. The system of claim 1, wherein the listing of the at least some of the plurality of text-based notifications is displayed within the graphical user interface view in a column including a plurality of rows, wherein a different one of the at least some of the plurality of text-based notifications is presented in each row included in the plurality of rows.

8. The system of claim 1, wherein a text-based notification included in the plurality of text-based notifications presented in the listing is provided with a graphical object that is selectable by way of a user input to at least one of access information associated with the text-based notification or resolve an issue associated with the text-based notification.

9. The system of claim 8, wherein the processor is further configured to execute the instructions to:

detect a user input provided with respect to the graphical object; and perform an operation with respect to the hearing device based on the user input.

10. The system of claim 1, wherein the processor is further configured to execute the instructions to:

access additional configuration parameters indicative of a previous configuration of the hearing device;

determine an additional text-based notification associated with the previous configuration of the hearing device; and present, within the graphical user interface view, the additional text-based notification together with the listing of the at least some of the plurality of text-based notifications.

11. The system of claim 10, wherein the processor is further configured to execute the instructions to:

detect a user input provided with respect to the additional text-based notification; and restore, based on the user input, the previous configuration of the hearing device.

12. A system comprising:

a hearing device; and a fitting device communicatively coupled to the hearing device and configured to:

query the hearing device for configuration parameters indicative of a current configuration of the hearing device;

determine, based on the configuration parameters, a plurality of text-based notifications associated with the current configuration of the hearing device, each text-based notification included in the plurality of text-based notifications indicative of a different issue to be considered when fitting the hearing device to a user;

determine a ranking for each text-based notification included in the plurality of text-based notifications;

select an order of text-based notifications included in a listing of at least some of the plurality of text-based notifications based on the ranking for each text-based notification; and present, within a graphical user interface view displayed by a display device, a hearing device fitting interface concurrently with the listing of the at least some of the plurality of text-based notifications.

13. The system of claim 12, wherein the plurality of text-based notifications includes a first set of text-based notifications associated with actions performed by a user of the hearing device and a second set of text-based notifications associated with issues to be resolved when fitting the hearing device to the user.

14. The system of claim 13, wherein the second set of text-based notifications are prioritized within the listing in relation to the first set of text-based notifications.

15. The system of claim 13, wherein the first set of text-based notifications include a graphical effect that visually differentiates of the first set text-based notifications from the second set of text-based notifications.

16. The system of claim 12, wherein:

the fitting device is further configured to:

compare the configuration parameters to default parameters indicative of essential operating parameters of the hearing device; and determine, based on the comparing of the configuration parameters to the default parameters, that there is a deviation between the configuration parameters and the default parameters; and the determining of the plurality of text-based notifications is based on the deviation between the configuration parameters and the default parameters.

17. A method comprising:

accessing, by a processor, configuration parameters indicative of a current configuration of a hearing device;

determining, by the processor and based on the configuration parameters, a plurality of text-based notifications associated with the current configuration of the hearing device, each text-based notification included in the plurality of text-based notifications indicative of a different issue to be considered when fitting the hearing device to a user;

determining, by the processor, a ranking for each text-based notification included in the plurality of text-based notifications;

selecting, by the processor, an order of text-based notifications included in a listing of at least some of the plurality of text-based notifications based on the ranking for each text-based notification; and presenting, by the processor and within a graphical user interface view displayed by a display device, a hearing device fitting interface concurrently with the listing of the at least some of the plurality of text-based notifications.

18. The method of claim 17, further comprising:
comparing, by the processor, the configuration parameters to default parameters indicative of essential operating parameters of the hearing device; and
determining, by the processor and based on the comparing of the configuration parameters to the default parameters, that there is a deviation between the configuration parameters and the default parameters,
wherein the determining of at least some of the plurality of text-based notifications is based on the deviation between the configuration parameters and the default parameters.

19. A system comprising:
a memory storing instructions; and
a processor communicatively coupled to the memory and configured to execute the instructions to:
access configuration parameters indicative of a current configuration of a hearing device;
compare the configuration parameters to default parameters indicative of essential operating parameters of the hearing device;
determine, based on the comparing of the configuration parameters to the default parameters, that there is a deviation between the configuration parameters and the default parameters;
determine, based on the configuration parameters, a plurality of text-based notifications associated with the current configuration of the hearing device, each text-based notification included in the plurality of text-based notifications indicative of a different issue to be considered when fitting the hearing device to a user, the determining of at least some of the plurality of text-based notifications being based on the deviation between the configuration parameters and the default parameters; and
present, within a graphical user interface view displayed by a display device, a hearing device fitting interface concurrently with a listing of at least some of the plurality of text-based notifications.

20. A system comprising:
a hearing device; and
a fitting device communicatively coupled to the hearing device and configured to:
query the hearing device for configuration parameters indicative of a current configuration of the hearing device;
compare the configuration parameters to default parameters indicative of essential operating parameters of the hearing device;
determine, based on the comparing of the configuration parameters to the default parameters, that there is a deviation between the configuration parameters and the default parameters;
determine, based on the configuration parameters, a plurality of text-based notifications associated with the current configuration of the hearing device, each text-based notification included in the plurality of text-based notifications indicative of a different issue to be considered when fitting the hearing device to a user, the determining of at least some of the plurality of text-based notifications being based on the deviation between the configuration parameters and the default parameters; and
present, within a graphical user interface view displayed by a display device, a hearing device fitting interface concurrently with a listing of at least some of the plurality of text-based notifications.

* * * * *